United States Patent Office 3,264,122
Patented August 2, 1966

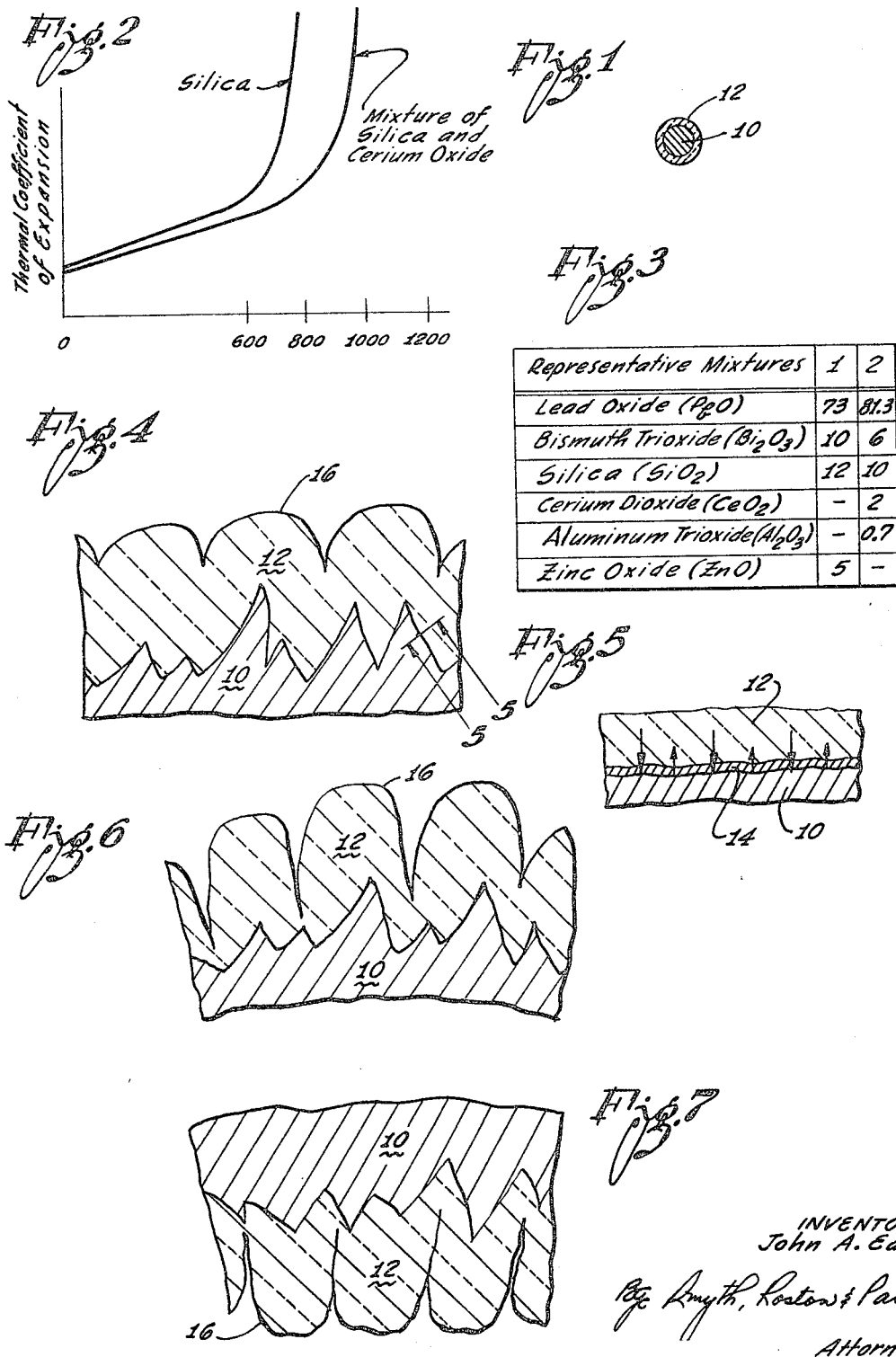

3,264,122
INSULATING COATING COMPOSITIONS FOR ELECTRICAL CONDUCTORS
John A. Earl, Alhambra, Calif., assignor, by mesne assignments, to Physical Sciences Corporation, a corporation of California
Filed Aug. 22, 1960, Ser. No. 51,071
9 Claims. (Cl. 106—49)

This application is a continuation-in-part of copending application Serial No. 847,081 filed October 19, 1959, by me for "Insulating Coating for Electrical Conductors," now abandoned.

This invention relates to insulating coating material for electrical conductors and, more particularly, to an improved coating for wire which may be exposed to radiation derived from a nuclear reactor.

It has been noted that electrical instruments which were used in connection with the operation of a nuclear reactor would have a limited life. Upon investigation, it was found that the wire, and, more specifically, the coating on the wire employed in the instruments, would deteriorate as a result of having been subjected to nuclear particle bombardment, with a consequent loss, not only of the electrical property, but also causing mechanical distortion. Further, a high thermoneutron capture was noted which resulted in a serious distortion of the reactor field.

It is an object of this invention to provide an insulating coating for wire having a lower thermoneutron capture than heretofore.

Another object of this invention is to provide a coating for wire which can be exposed to particle bombardment in the field of a reactor without deterioration of mechanical and electrical properties.

Yet another object of the present invention is the provision of a novel coating for application to high or low temperature conductors, such as aluminum and magnetic carbon steels, which can maintain its electrical insulating properties at high temperatures.

These and other objects of the invention are achieved by coating aluminum wire, for example, with a slip prepared from a mixture of material wherein boron has been eliminated. Upon investigation, it was found that the boron employed in the material used for providing an insulating coating distorted the reactor field. This was followed by a mechanical and electrical failure of the material. Boron oxide has a high thermoneutron capture cross section, on the order of 1,548 Barnes. In accordance with this invention, there is substituted in place of the boron a material with corresponding mechanical and electrical properties, but with a very much lower capture effect. In accordance with this invention, such substitute is bismuth trioxide ($Bi_2O_3$), which has a capture effect of only 30 Barnes. As a result, a coating for insulating wire is obtained which is substantially unaffected by nuclear flux, which maintains its electrical insulation at temperatures on the order of 1000° F., whereby it is possible to manufacture and use instruments in a nuclear reactor heretofore not believed possible.

In the drawings:

FIGURE 1 is a sectional view of a wire produced in accordance with the concepts of this invention;

FIGURE 2 shows a pair of curves illustrating the relationship between temperature and the coefficient of expansion for silica and a mixture containing silica and cerium oxide;

FIGURE 3 provides a table illustrating the raw weights of various materials which have been used in producing representative ceramics included within the scope of this invention;

FIGURE 4 is a greatly enlarged schematic sectional view of the ceramic layer on the wire;

FIGURE 5 is a greatly enlarged section on the line 5—5 of FIGURE 4 and illustrates how the ceramic layer fuses into the oxide film on the surface of the metal wire;

FIGURE 6 is a view similar to FIGURE 4 and illustrates how the ceramic behaves on the outer side of a bend in the completed wire; and FIGURE 7 is a view similar to that shown in FIGURE 6 and illustrates how the ceramic layer behaves on the inner side of a bend in the wire.

The novel coating in accordance with this invention comprises a slip which may be made from a mixture by weight of lead oxide (PbO) from 70% to 76%, silicon dioxide ($SiO_2$) from 10% to 14%, bismuth trioxide ($Bi_2O_3$) from 7% to 14%, and from 4% to 6% of any one of barium oxide (BaO), lanthanum trioxide ($La_2O_3$), magnesium oxide (MgO), calcium oxide (CaO), and zinc oxide (ZnO). The lead oxide and silicon dioxide are usually purchased as a mixture commercially designated as lead monosilicate.

A preferred mixture in accordance with this invention is, by weight, 85% of lead monosilicate, 5% of zinc oxide, and 10% of bismuth trioxide. To prepare the slip, the ingredients are thoroughly mixed and then smelted until homogenized. A preferred smelting temperature is on the order of 2100° F. After being homogenized, the mixture is quenched in water. Thereafter, it is ground through a 400-mesh screen, providing a slip which can be applied directly to the wire.

This slip can be used for coating low-temperature wire which is made, for example, from aluminum or magnetic carbon steel strip. After the slip is applied directly to the wire, it is fired. A suitable firing temperature is between 1000° F. and 1200° F. The wire can be held stationary for three minutes at these temperatures, or other temperatures can be employed with the wire in motion where the temperature depends upon the speed of the wire travel and the length of the furnace hot zone through which the wire travels. For example, with a hot zone four to six inches long and wire-travel speed of five feet per minute, a temperature of 1000° F. adequately cured the coating.

It should be noted that the firing temperature may be higher than the melting point of the aluminum wire. As previously pointed out, this insulation coating is superior to those previously known in that it maintains its electrical insulation properties at 1000° F. and is unaffected by exposure to nuclear flux. At room temperature, the resistivity of the coating was on the order of $1 \times 10^{14}$ ohms, and at 1000° F. the resistivity was on the order of $4 \times 10^7$ ohms.

Various materials capable of being used in forming ceramics may be generally divided as follows into three groups or categories:

Glass modifiers:
    Lithium oxide ($Li_2O$)
    Sodium oxide ($Na_2O$)
    Potassium oxide ($K_2O$)
    Lead oxide (PbO)
    Zinc oxide (ZnO)
    Strontium oxide (SrO)
    Barium oxide (BaO)
    Calcium oxide (CaO)
    Magnesium oxide (MgO)

Glass formers:
    Arsenic oxide ($As_2O_3$)
    Boron oxide ($B_2O_3$)
    Bismuth oxide ($Bi_2O_3$)
    Aluminum oxide ($Al_2O_3$)
    Lanthanum oxide ($La_2O_3$)
    Antimony oxide ($Sb_2O_3$ and $Sb_2O_5$)

Glass acid:
- Silicon dioxide ($SiO_2$)
- Cerium dioxide ($CeO_2$)
- Zirconium dioxide ($ZrO_2$)
- Titanium dioxide ($TiO_2$)
- Molybdenum trioxide ($MoO_3$)

It will be appreciated that the listing of some of the materials may be considered as somewhat arbitrary since these materials may be considered by some people as belonging in a different one of the lists than set forth above. However, the listing of the materials as set forth above will be considered as proper by many of the experts in the art. It will also be appreciated that other materials may also be included in each of the different categories. For example, the oxides of copper, silver and cadmium may be included in the first category designated as the glass modifiers. These additional materials have not been included because they have low electrical resistivities and because at least some of these materials will even act as electrical conductors in colloidal solutions.

The glass modifiers may in general be considered as having alkaline properties and the properties of a base. The glass modifiers may be further considered as having a chemical formula which may be designated as $R_2O$ or RO, where R indicates the element forming the compound with the oxygen (O). The alkalinity of the element in combination with oxygen in the glass forming category or group tends to decrease progressively down the list, as does the reactivity of the compound with an acid. The electrical resistivity of the material at any particular temperature tends to increase progressively down the list. The melting temperature of the compounds in the glass modifiers tends to increase progressively down the list. No definite pattern as to the thermal coefficient of expansion of the oxides in the first category occurs with progressive listings in this category.

The third category or group may be considered as glasses and as having acidic properties. The chemical formula of these glasses may be expressed as $RO_2$ or $RO_3$, where R is the element forming the glass compound with the oxygen. The melting temperatures of the different oxides included in the third category or group tend to increase progressively down the list although the melting temperatures of all of the oxides in the third category are relatively high. The reactivity of the different oxides in the third category with acids tends to increase progressively down the list. No definite pattern as to the thermal coefficient of expansion of the oxides in the third category occurs with progressive listings in the category.

The second category or group of compounds may be designated as glass formers in that the compounds in the second category tend to react with the compounds in the third category to form the ceramic materials. The compounds in the second category or group may be designated by the chemical formula $R_2O_3$, where R indicates the element forming the compound with the oxygen. The glass formers are intermediate in chemical and physical properties to the glass modifiers and to the glasses. For example, the glass formers may react chemically with either acidic or alkaline materials. The acid resistivity of the different oxides in the second category tends to increase progressively down the list, as does the melting temperature of the different oxides in this category. No definite pattern tends to exist as to the thermal coefficient of expansion of the different oxides listed progressively in the second category.

The ceramics constituting this invention are formed by combining materials from each of the three categories set forth above. The particular materials used and the properties of such materials are dependent upon the characteristics desired for the ceramics such as glass to be produced from the material. For example, such characteristics as the melting temperature of the ceramic, the acid resistance of the ceramic, the thermal coefficient of expansion of the ceramic for different temperatures and the electrical resistivity of the ceramic at different temperatures may be controlled by varying the particular materials used and by varying the proportions of such materials. Although the ceramics constituting this invention may be used as glasses, they can be also used as coatings or glazes and designated as "enamels."

Bismuth trioxide is included in the mixtures for producing the ceramics constituting this invention because it has a low tendency to capture thermoneutrons, especially in comparison to the oxide of boron previously included in mixtures for making ceramics. The other oxides included in the mixtures also have a low tendency to capture thermoneutrons. In this way, the ceramics constituting this invention do not tend to deteriorate as to such properties as electrical resistivity when exposed to thermonuclear bombardment. The ceramics constituting this invention are especially advantageous at elevated temperatures since they do not deteriorate under thermonuclear bombardment at elevated temperatures whereas ceramics previously in use have deteriorated quickly under thermonuclear bombardment at elevated temperatures.

As will be noticed, only a relatively small proportion of silica is included in the mixtures for producing the ceramics constituting this invention. A relatively small amount of silica is included to minimize the glassy state of the ceramic since such a glassy state causes the ceramic to be brittle. Furthermore, the reduction in the amount of silica in the mixture permits an increase in the amount of lead oxide in the mixture. This is desirable because of the properties of the lead oxide in making the ceramic relatively flexible and resilient. The properties of flexibility and resiliency for ceramics on aluminum wire are advantageous because it is often desired to bend the wire in leading the wire from one electrical terminal to a second electrical terminal.

Although one of the oxides of barium, lanthanum, magnesium, calcium and zinc is specified for inclusion in the mixture constituting this invention, it will be appreciated that other oxides may also be used. For example, the oxides of strontium and beryllium may also be used. The oxide of beryllium may be considered as slightly disadvantageous in comparison to the other oxides specified above because it has a high melting temperature. The oxide of strontium may also be considered as slightly disadvantageous in comparison to the other oxides specified above because it can form a radioactive condition by capturing alpha particles and beta particles.

The various materials specified above for inclusion in the mixture are advantageous for another important reason. This results from the fact that each of such materials has a lower coefficient of expansion with changes in temperature than the aluminum wire on which the ceramic produced from the wire is coated. This causes the ceramic to be maintained under compression on the wire through a wide range of temperatures. Compression of the ceramic on the aluminum wire is desirable in order to maintain an optimum bond between the ceramic and the wire and in order for the ceramic to provide optimum properties of electrical insulation.

It will be appreciated that this invention is not intended to be limited to the particular mixtures specified above. For example, a mixture having the following composition has also been used successfully to produce a ceramic for providing an electrical insulation for an aluminum wire:

| Material: | Percentage |
| --- | --- |
| Lead oxide (PbO) | 81.3 |
| Bismuth trioxide ($Bi_2O_3$) | 6 |
| Silicon dioxide ($SiO_2$) | 10 |
| Cerium dioxide ($CeO_2$) | 2 |
| Aluminum oxide ($Al_2O_3$) | 0.7 |

This mixture is also set forth in column 2 of FIGURE 3.

The cerium in the mixture set forth in the preceding paragraph acts as a glass modifier and also helps to make the resultant ceramic flexible by inhibiting the production of a glassy phase in the ceramic. The oxide of cerium has been included for certain other important reasons which may perhaps be seen by reference to the curves shown in FIGURE 2. As will be seen from FIGURE 2, the thermal coefficient of ordinary glass remains fairly stable until a temperature of approximately 750 degrees Fahrenheit (750° F.). The thermal coefficient of expansion of the ordinary glass using silica then increases at a rapid rate with increases in temperature above 750° F. This is undesirable, especially when the ordinary glass is formed around a metal to bond to the metal. The reason is that the glass expands excessively and breaks the bond with the metal. However, when the oxide of cerium is used in combination with silica in the mixture producing the ceramics constituting this invention, the thermal coefficient of expansion of the ceramics remains fairly stable to temperatures in excess of approximately 1000° F.

Aluminum oxide has been included in the above mixture in the ratio of approximately one (1) part by weight of aluminum to approximately thirteen (13) parts by weight of silicon. The aluminum and silicon have been preferably included in this ratio because a eutectic point occurs when the aluminum and silicon are mixed in the proper proportions of 1:13. This eutectic point causes the melting point of aluminum and silicon to be reduced considerably below the melting point of either aluminum or silicon alone.

As will be seen from FIGURE 117 of "Phase Diagram for Ceramists" published by the American Ceramic Society in 1956, the melting point of the mixture of aluminum and silicon in the ratio of approximately 1:13 approaches the smelting temperature of approximately 2100° F. described above. A reduced melting point of the mixture of aluminum and silicon is desirable because the fusion between the two elements becomes considerably enhanced at the reduced temperatures.

As will be seen from FIGURE 3, the amount of lead oxide used in each of the mixtures included within this invention is considerably in excess of fifty percent (50%) by weight. The amount of lead oxide is actually considerably in excess of the combined total by weight of the amount of bismuth trioxide and silica. Actually, the amount of lead oxide by weight in each of the examples of FIGURE 3 is actually at least six (6) times by weight as great as the amount of either the bismuth trioxide or the silica.

It will also be appreciated that the numerals setting forth the different amounts of materials represent percentages by weight and that substitutions may be made in the amounts of such materials without departing from the scope of the invention. For example, although lead oxide (PbO) has been specified, red lead ($Pb_3O_4$) may actually be used, especially since it liberates free oxygen. White lead [$2PbCO_3 \cdot Pb(OH)_2$], lead monosilicate ($PbSiO_3$), lead bisilicate ($PbO \cdot 2(SiO_2)$) or lead trisilicate may also be used. Other forms of bismuth than bismuth trioxide may also be used, an example being bismuth subnitrate. Because of this, claims setting forth ranges of elements are considered to include equivalent amounts of different forms of the same elements within the scope of the claims.

Three factors are involved in the successful coating of metallic wiring such as aluminum by the ceramics constituting this invention. These factors make it possible for the first time to apply a firm and permanent bonding between the ceramic coating and the aluminum wire. As a first factor, the ceramic coating is bonded to an oxide film that is in turn tenaciously adherent to the aluminum wire. As a second factor, there is an additional physical or mechanical bond between the ceramic and the oxide coating on the wire. As a third factor, the ceramic coating is nodular. These three factors may be appreciated by referring to FIGURES 4 to 7, inclusive.

In FIGURES 4 to 7, inclusive, the metal of the wire is indicated by reference numeral 10, and the ceramic coating is indicated by reference numeral 12. The profile of the roughness of the metal surface is somewhat exaggerated to emphasize the fact that there are in the surface of the metal numerous minute irregular recesses into which portions of the ceramic penetrate.

With reference to the first factor, FIGURE 5 shows on a greatly enlarged scale the aluminum oxide film 14 on the surface of the wire when the coated travelling wire is fired in the correct manner. The ceramic 12 penetrates or fuses into the oxide film 14 as indicated by the relatively large arrows in FIGURE 5, and the oxide film fuses into the ceramic as indicated by the small arrows in FIGURE 5. The mutual fusion involves complex chemical reactions and changes the composition of both the ceramic and oxide film, the final result being a tenacious chemical bonding of the ceramic to the oxide film. Since the oxide film is tenaciously adherent to the metal 10, the result is that the ceramic layer is bonded to the metal.

The bonding of the ceramic coating 12 to the metal wire 10 occurs within relatively close temperature tolerances. This results from the fact that under-firing the wire results in insufficient mutual fusion between the ceramic and the oxide film and consequent failure of the ceramic to bond to the wire. On the other hand, over-firing with excessive penetration of the ceramic into the oxide film causes the oxide film to disappear into the ceramic with consequent failure of the ceramic to bond to the metal. The temperature is dependent upon such factors as the thickness of the wire, the thickness of the ceramic coating on the wire and the amount of time during which the ceramic coating on the wire is subjected to the bonding temperatures. For a given set of parameters, the temperature range between failure by reason of under-firing and failure by reason of over-firing may be 25 degrees Fahrenheit.

The second factor depends upon the fact that the metal of the wire has a greater coefficient of thermal expansion than the ceramic. When the ceramic and the metal of the wire cool together, the minute recesses in the surface of the metal contract faster than the ceramic to engage the corresponding portions of the ceramic in a positive manner. It is this contraction of the metal recesses that results in the mechanical or physical bond between the metal and the ceramic.

The third factor is the production of a ceramic layer of nodular character, the ceramic layer being characterized by minute nodules or knobs 16. When the ceramic is heated to a certain degree depending upon the particular ceramic mixture and upon other parameters as set forth above, maximum surface tension is developed to cause the rounded nodules 16 to form. The required surface tension is not created if the temperature of the ceramic is either too high or too low. For example, the bonding of the ceramic to aluminum wire may occur at a temperature of approximately 1520° F. when the wire has a diameter of 0.159 inch and the combination of the ceramic coating and the wire has a diameter of 0.168 inch and the ceramic has a composition as indicated in the first column of FIGURE 3.

The importance of the nodular configuration of the ceramic layer may be appreciated by considering FIGURES 6 and 7. When the wire is bent to a radius, the nodules 16 tend to separate and fan out on the outside of the curve as indicated in FIGURE 6. The nodules tend to separate or diverge because the least resistance to cleavage is at the juncture of the nodules 16 and the fractures tend to occur radially largely because of the combined effectiveness of the physical and chemical bonding of inner portion of the ceramic to the wire.

FIGURE 7 shows how the nodules 16 tend to converge and crowd together on the inner side of the curvature of the wire. Because of the high lead content of the ceramic, there is a certain degree of resiliency in the nodules 16. This resiliency permits a slight lateral compression of the nodules. In addition, the ceramic material tends to pulverize and drop away from the surfaces of mutual pressure contact between contiguous nodules. This tends to provide a reduction in the width of the nodules as required to accommodate the inside curve of the wire.

Because of the described behaviour of the ceramic coating under flexure of the wire, the finished wire may be wound on a mandrel of a diameter as small as five times the diameter of the wire without destroying the protective ceramic coating. As the wiring is subsequently straightened, the divergent gaps shown in FIGURES 6 close together and similar gaps develop between the nodules shown in FIGURE 7, the protective and insulating effectiveness of the ceramic coating being maintained.

The ceramic materials constituting this invention may be produced by initially mixing the various ingredients thoroughly. The mixture is then smelted at a suitable temperature in the range of approximately 1800° F. to 2100° F. The material is then suitably quenched as in water and ground to a fine particle size such as 400 mesh.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A ceramic frit, of the type comprising glass and enamel for coating metallic wire to provide electrical insulation for the wire where the electrical insulation has a value of approximately $1 \times 10^{14}$ ohms at a temperature of approximately 70° F. and a value of approximately $4 \times 10^7$ ohms at a temperature approximately 1000° F., the frit consisting of: the oxide of silicon having a weight of approximately 10%, the oxide of bismuth having a weight of approximately 6% to provide a low thermonuclear capture effect, the oxide of lead having a weight of approximately 81.3%, the oxide of cerium having a weight of approximately 2%, and the oxide of aluminum having a weight of approximately 0.7%.

2. An electrically insulating, low-thermoneutron-capture wire coating composition, of the type comprising glass and enamel, where the electrical insulation approaches approximately $1 \times 10^{14}$ ohms at a temperature of approximately 70° F. and approaches approximately $4 \times 10^7$ ohms at a temperature of approximately 1000° F., the coating composition consisting of: a frit of lead oxide about 70 to 76 parts by weight, silicon dioxide about 10 to 14 parts by weight, bismuth trioxide about 6 to 14 parts by weight, and from 4 to 6 parts by weight of at least one of the oxides of barium, lanthanum, magnesium, calcium, zinc, strontium and beryllium.

3. An electrically insulating, low-thermoneutron-capture wire coating composition of the type comprising glass and enamel, where the electrical insulation approaches approximately $1 \times 10^{14}$ ohms at a temperature of approximately 70° F. and approaches approximately $4 \times 10^7$ ohms at a temperature of approximately 1000° F., the coating composition consisting of: a frit of lead oxide substantially 73 parts by weight, silicon dioxide substantially 12 parts by weight, zinc oxide substantially 5 parts by weight, and bismuth trioxide substantially 10 parts by weight.

4. An electrically insulating, low-thermoneutron-capture wire coating composition of the type comprising glass and enamel, where the electrical insulation has a value approaching approximately $1 \times 10^{14}$ ohms at a temperature of approximately 70° F. and has a value approaching approximately $4 \times 10^7$ ohms at a temperature of approximately 1000° F., the coating composition consisting of: a mixture of substantially 73 parts by weight of lead monosilicate, substantially 5 parts by weight of zinc oxide, substantially 12 parts by weight of silicon dioxide and substantially 10 parts by weight of bismuth trioxide.

5. In a ceramic material, of the type comprising glass and enamel, for coating metallic wire to provide electrical insulation for the wire where the electrical insulation has a value approaching approximately $1 \times 10^{14}$ ohms at a temperature of approximately 70° F. and has a value approaching approximately $4 \times 10^7$ ohms at a temperature of approximately 1000° F., the oxide of silicon having a weight of approximately 10% to 14%, the oxide of bismuth having a weight of approximately 6% to 14%, and the oxide of lead having a weight of approximately 70% to 81%.

6. In a ceramic material, of the type comprising glass and enamel for coating metallic wire to provide electrical insulation for the wire where the electrical insulation has a value approaching approximately $1 \times 10^{14}$ ohms at a temperature of approximately 70° F. and a value approaching approximately $4 \times 10^7$ ohms at a temperature of approximately 1000° F., the oxide of lead having a weight of approximately 70% to 81%, the oxide of silicon having a weight of approximately 10% to 14%, the oxide of bismuth having a weight of approximately 6% to 14% to provide a low thermonuclear capture effect, and the oxides of materials selected from the group consisting of barium, lanthanum, magnesium, calcium, zinc, strontium and beryllium and having a weight of approximately 4% to 6%.

7. In a ceramic frit, of the type comprising glass and enamel for coating metallic wire to provide electrical insulation for the wire where the electrical insulation has a value as high as approximately $1 \times 10^{14}$ ohms at a temperature of approximately 70° F. and a value as high as approximately $4 \times 10^7$ ohms at a temperature of approximately 1000° F.: the oxide of silicon with a weight of approximately 10% to 14%, the oxide of bismuth with a weight of approximately 6% to 14% to provide a low thermonuclear capture effect, the oxide of lead with a weight of approximately 70% to 81%, and the oxide of aluminum with a weight of approximately 0.7% to 1.1% to form a eutectic with the oxide of silicon.

8. The composition set forth in claim 7 in which the oxide of aluminum is included in the mixture in the ratio of 1 part by weight of the oxide of aluminum to 13 parts by weight of the oxide of silicon to form a eutectic.

9. In the ceramic material set forth in claim 8, the oxide of cerium with a weight of approximately 2% by weight.

References Cited by the Examiner

UNITED STATES PATENTS

| | | | |
|---|---|---|---|
| 2,207,723 | 7/1940 | Deyrup | 106—49 |
| 2,508,511 | 5/1950 | Goodman | 106—49 |
| 2,568,847 | 9/1951 | Deyrup | 106—49 |
| 2,588,920 | 3/1952 | Green | 106—49 |
| 2,708,656 | 5/1955 | Fermi et al. | 204—193 |
| 2,946,704 | 7/1960 | King et al. | 117—129 |
| 2,975,078 | 3/1961 | Rayfield | 117—129 |
| 3,051,589 | 8/1962 | Sanford et al. | 106—48 |
| 3,062,685 | 11/1962 | Sanford et al. | 106—48 |
| 3,080,134 | 3/1963 | England et al. | 117—129 |
| 3,106,490 | 10/1963 | Earl | 106—49 |

OTHER REFERENCES

Levin et al.: Phase Diagrams for Ceramists, published 1956 by American Ceramic Soc. (FIGURE 116).

TOBIAS E. LEVOW, *Primary Examiner.*

JOSEPH REBOLD, *Examiner.*

D. ARNOLD, H. McCARTHY, *Assistant Examiners.*